United States Patent
Paul et al.

(10) Patent No.: US 7,050,606 B2
(45) Date of Patent: May 23, 2006

(54) TRACKING AND GESTURE RECOGNITION SYSTEM PARTICULARLY SUITED TO VEHICULAR CONTROL APPLICATIONS

(75) Inventors: George V. Paul, Belleville, MI (US); Glenn J. Beach, Ypsilanti, MI (US); Charles J. Cohen, Ann Arbor, MI (US); Charles J. Jacobus, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 800 days.

(21) Appl. No.: 10/004,058

(22) Filed: Nov. 1, 2001

(65) Prior Publication Data

US 2002/0126876 A1    Sep. 12, 2002

Related U.S. Application Data

(63) Continuation-in-part of application No. 09/798,594, filed on Mar. 2, 2001, which is a continuation-in-part of application No. 09/371,460, filed on Aug. 10, 1999, now Pat. No. 6,681,031.

(60) Provisional application No. 60/245,034, filed on Nov. 1, 2000.

(51) Int. Cl.
*G06K 9/00* (2006.01)

(52) U.S. Cl. .................. 382/104; 348/154; 701/45
(58) Field of Classification Search ............ 382/103, 382/104, 108, 106, 107; 180/271; 701/45; 280/734, 735; 340/903; 348/169; 345/865, 345/158, 173; 356/3
See application file for complete search history.

(56) References Cited

U.S. PATENT DOCUMENTS 4,746,770 A    5/1988 McAvinney ................. 178/18
5,490,069 A *  2/1996 Gioutsos et al. ............. 701/45
5,574,498 A * 11/1996 Sakamoto et al. ........... 348/169
5,684,701 A * 11/1997 Breed .......................... 701/45

(Continued)

OTHER PUBLICATIONS

Birchfield, S. "Elliptical Head Tracking Using Intensity Gradients and Color Histogram," Proceedings of the IEEE Conference on Computer Vision and Pattern Recognition. Santa Barbara, California, pp. 232-237, Jun. 1998.

Horn, B. K. P. "Robot Vision," The MIT Press, Cambridge, Massachusetts, 1986.

*Primary Examiner*—Barry Choobin
(74) *Attorney, Agent, or Firm*—Gifford, Krass, Groh, Sprinkle, Anderson & Citkowski, PC

(57) ABSTRACT

A system and method tracks the movements of a driver or passenger in a vehicle (ground, water, air, or other) and controls devices in accordance with position, motion, and/or body or hand gestures or movements. According to one embodiment, an operator or passenger uses the invention to control comfort or entertainment features such the heater, air conditioner, lights, mirror positions or the radio/CD player using hand gestures. An alternative embodiment facilitates the automatic adjustment of car seating restraints based on head position. Yet another embodiment is used to determine when to fire an airbag (and at what velocity or orientation) based on the position of a person in a vehicle seat. The invention may also be used to control systems outside of the vehicle. The on-board sensor system would be used to track the driver or passenger, but when the algorithms produce a command for a desired response, that response (or just position and gesture information) could be transmitted via various methods (wireless, light, whatever) to other systems outside the vehicle to control devices located outside the vehicle. For example, this would allow a person to use gestures inside the car to interact with a kiosk located outside of the car.

14 Claims, 5 Drawing Sheets

U.S. PATENT DOCUMENTS

| | | |
|---|---|---|
| 5,774,591 A | 6/1998 | Black et al. ............... 382/236 |
| 5,802,220 A | 9/1998 | Black et al. ............... 382/276 |
| 5,838,365 A * | 11/1998 | Sawasaki et al. .......... 348/169 |
| 5,878,151 A | 3/1999 | Tang et al. ................ 382/103 |
| 5,912,980 A | 6/1999 | Hunke ....................... 382/103 |
| 5,966,129 A | 10/1999 | Matsukuma et al. ........ 345/418 |
| 5,973,732 A | 10/1999 | Guthrie ..................... 348/169 |
| 6,002,428 A | 12/1999 | Matsumura et al. ........ 348/169 |
| 6,002,808 A | 12/1999 | Freeman .................... 382/288 |
| 6,005,549 A | 12/1999 | Forest ....................... 345/157 |
| 6,009,210 A | 12/1999 | Kang ........................ 382/276 |
| 6,014,167 A | 1/2000 | Suito et al. ................ 348/169 |
| 6,031,568 A | 2/2000 | Wakitani .................... 348/169 |
| 6,035,067 A | 3/2000 | Ponticos ..................... 382/226 |
| 6,066,954 A * | 5/2000 | Gershenfeld et al. ....... 324/671 |
| 6,075,557 A | 6/2000 | Holliman et al. ............ 348/51 |
| 6,075,895 A | 6/2000 | Qiao et al. ................. 382/218 |
| 6,082,764 A * | 7/2000 | Seki et al. ................. 280/735 |
| 6,088,017 A | 7/2000 | Tremblay et al. ........... 345/156 |
| 6,088,019 A * | 7/2000 | Rosenberg ................. 345/156 |
| 6,130,964 A | 10/2000 | Marques et al. ............ 382/236 |
| 6,154,559 A | 11/2000 | Beardsley ................... 382/103 |
| 6,163,336 A | 12/2000 | Richards ...................... 348/42 |
| 6,173,066 B1 | 1/2001 | Peurach et al. ............. 382/103 |
| 6,188,777 B1 | 2/2001 | Darrell et al. .............. 382/103 |
| 6,275,213 B1 | 8/2001 | Tremblay et al. ........... 345/156 |
| 6,298,170 B1 * | 10/2001 | Morita et al. ............... 382/278 |
| 6,353,427 B1 * | 3/2002 | Rosenberg .................. 345/156 |
| 6,529,809 B1 * | 3/2003 | Breed et al. .................. 701/45 |
| 6,545,670 B1 * | 4/2003 | Pryor ........................ 345/173 |
| 6,720,949 B1 * | 4/2004 | Pryor et al. ................. 345/158 |
| 6,766,036 B1 * | 7/2004 | Pryor ........................ 382/103 |
| 2001/0029416 A1 * | 10/2001 | Breed et al. .................. 701/45 |
| 2002/0029103 A1 * | 3/2002 | Breed et al. .................. 701/45 |
| 2002/0036617 A1 * | 3/2002 | Pryor ........................ 345/156 |
| 2002/0097223 A1 * | 7/2002 | Rosenberg .................. 345/157 |
| 2003/0125855 A1 * | 7/2003 | Breed et al. .................. 701/36 |
| 2003/0209893 A1 * | 11/2003 | Breed et al. ................ 280/735 |

\* cited by examiner

```
Given new image and the estimated target center as rc, cc and old target shape
begin
    for i=rc-rs/2 to i=rc+rs/2
        for j=cc-cs/2 to j=cc+cs/2
            RGB = pixel(i,j)
            c = FindColorMatch(RGB)
            if c>0
                cr = c*i
                cc = c*j
                if this pixel lies on the previous shape template
                    sr = c*i
                    sc = c*j
                    s = c;
                else pixel shows movement
                    mr = c*i
                    mc = c*j
                    m = c;
                endif
                mark this pixel in the next shape template
                Nc = Nc+c
                Ns = Ns+s
                Nm = Nm+m
            else
                unmark this pixel in the next shape template
            endif
        endfor
    endfor cr = cr/Nc, cc = cc/Nc
    sr = or/Ns, sc = sc/Ns
    mr = mr/Nm, mc = mc/Nm compute new target center as a weighted average
    newr = cr*cw + sr*sw + mr*mw
    newc = cc*cw + sc*sw + mc*mw
    velr = (newr-rc)/t
    velc = (newc-cc)/t
```

FIGURE 6

TRACKING AND GESTURE RECOGNITION SYSTEM PARTICULARLY SUITED TO VEHICULAR CONTROL APPLICATIONS

REFERENCE TO RELATED APPLICATIONS

This application claims priority of U.S. provisional application Ser. No. 60/245,034, filed Nov. 1, 2000, and is a continuation-in-part of U.S. patent application Ser. No. 09/798,594, filed Mar. 2, 2001, which is a continuation-in-part of U.S. patent application Ser. No. 09/371,460, filed Aug. 10, 1999, now U.S. Pat. No. 6,681,031 the entire contents of each application being incorporated herein by reference.

FIELD OF THE INVENTION

This invention resides in a system for tracking a driver or passenger in a vehicle and, in particular, to controlling operational devices or comfort features in the vehicle based on position, motion, and/or body or hand gestures.

BACKGROUND OF THE INVENTION

Gesture recognition has many advantages over other input means, such as the keyboard, mouse, speech recognition, and touch screen. The keyboard is a very open ended input device and assumes that the user has at least a basic typing proficiency. The keyboard and mouse both contain moving parts. Therefore, extended use will lead to decreased performance as the device wears down. The keyboard, mouse, and touch screen all need direct physical contact between the user and the input device, which could cause the system performance to degrade as these contacts are exposed to the environment. Furthermore, there is the potential for abuse and damage from vandalism to any tactile interface which is exposed to the public.

Tactile interfaces can also lead hygiene problems, in that the system may become unsanitary or unattractive to users, or performance may suffer. These effects would greatly diminish the usefulness of systems designed to target a wide range of users, such as advertising kiosks open to the general public. This cleanliness issue is very important for the touch screen, where the input device and the display are the same device. Therefore, when the input device is soiled, the effectiveness of the input and display decreases. Speech recognition is very limited in a noisy environment, such as sports arenas, convention halls, or even city streets. Speech recognition is also of limited use in situations where silence is crucial, such as certain military missions or library card catalog rooms.

Gesture recognition systems do not suffer from the problems listed above. There are no moving parts, so device wear is not an issue. Cameras, used to detect features for gesture recognition, can easily be built to withstand the elements and stress, and can also be made very small and used in a wider variety of locations. In a gesture system, there is no direct contact between the user and the device, so there is no hygiene problem. The gesture system requires no sound to be made or detected, so background noise level is not a factor. A gesture recognition system can control a number of devices through the implementation of a set of intuitive gestures. The gestures recognized by the system would be designed to be those that seem natural to users, thereby decreasing the learning time required. The system can also provide users with symbol pictures of useful gestures similar to those normally used in American Sign Language books. Simple tests can then be used to determine what gestures are truly intuitive for any given application.

For certain types of devices, gesture inputs are the more practical and intuitive choice. For example, when controlling a mobile robot, basic commands such as "come here", "go there", "increase speed", "decrease speed" would be most efficiently expressed in the form of gestures. Certain environments gain a practical benefit from using gestures. For example, certain military operations have situations where keyboards would be awkward to carry, or where silence is essential to mission success. In such situations, gestures might be the most effective and safe form of input.

SUMMARY OF THE INVENTION

This invention resides in a system for tracking a driver or passenger in a vehicle (ground, water, air, or other) and for controlling devices in that vehicle based on position, motion, and/or body/hand gestures. Broadly, the system tracks a person in the vehicle and uses their position and/or motions to control devices in the vehicle, or to have certain systems (such as safety or comfort systems) respond and adjust automatically.

According to one embodiment, an operator or passenger uses the invention to control comfort or entertainment features such as the heater, air conditioner, lights, mirror positions or the radio/CD player using hand gestures. An alternative embodiment facilitates the automatic adjustment of car seating restraints based on head position. Yet another embodiment is used to determine when to fire an airbag (and at what velocity or orientation) based on the position of a person in a vehicle seat.

The invention may also be used to control systems outside of the vehicle. The on-board sensor system would be used to track the driver or passenger, but when the algorithms produce a command for a desired response, that response (or just position and gesture information) could be transmitted via various methods (wireless, light, whatever) to other systems outside the vehicle to control devices located outside the vehicle. For example, this would allow a person to use gestures inside the car to interact with a kiosk located outside of the car.

BRIEF DESCRIPTION OF THE DRAWINGS

FIG. 6 illustrates steps of a method according to the invention written in pseudocode.

DETAILED DESCRIPTION OF THE INVENTION

Figure 1:
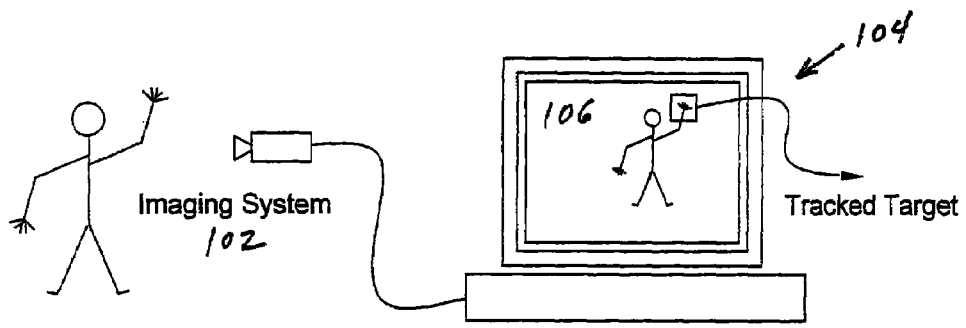
FIG. 1 is a simplified drawing of an imaging system and computer with tracking algorithm according to the invention.

This invention resides in a system and method for tracking a driver or passenger in a vehicle, and controlling operational devices, comfort or safety features in the vehicle based on position, motion, and/or body or hand gestures or movements. The invention is not limited in terms of vehicle type, and is applicable to ground, water, air and space applications.

Broadly, the system tracks a person in the vehicle, and uses their position and/or motions to control devices in the vehicle, or to have certain systems (such as safety or comfort systems) respond and adjust automatically. In the preferred embodiment, an interactive vehicular control system according to the invention would include the following components:

1. One or more cameras (or other sensing system) to view the driver or passenger;
2. A tracking system for tracking the position, velocity or acceleration of person's head, body, or other body parts;
3. A gesture/behavior recognition system for recognizing and identifying the person's motions; and
4. Algorithms for controlling devices in the vehicle, whether under active or passive control by the vehicle occupant.

Apart from the specific applicability to vehicular applications disclosed herein, the components listed above are disclosed and described in detail in U.S. patent application Ser. Nos. 09/371,460 and 09/798,594, the entire contents of which have been incorporated herein by reference.

The system described in U.S. patent application Ser. Nos. 09/371,460 not only recognizes static symbols, but dynamic gestures as well, since motion gestures are typically able to convey more information. In terms of apparatus, the system is preferably modular, and includes a gesture generator, sensing system, modules for identification and transformation into a command, and a device response unit. At a high level, the flow of the system is as follows. Within the field of view of one or more standard video cameras, a gesture is made by a person or device. During the gesture making process, a video image is captured, producing image data along with timing information. As the image data is produced, a feature-tracking algorithm is implemented which outputs position and time information. This position information is processed by static and dynamic gesture recognition algorithms. When the gesture is recognized, a command message corresponding to that gesture type is sent to the device to be controlled, which then performs the appropriate response.

The system preferably searches for static gestures only when the motion is very slow (i.e. the norm of the x and y—and z—velocities is below a threshold amount). When this occurs, the system continually identifies a static gesture or outputs that no gesture was found. Static gestures are represented as geometric templates for commonly used commands such as ON/OFF, Left/Right Turn, and so forth. Language gestures, such as the American Sign Language, can also be recognized.

A file of recognized gestures, which lists named gestures along with their vector descriptions, is loaded in the initialization of the system. Static gesture recognition is then performed by identifying each new description. A simple nearest neighbor metric is preferably used to choose an identification. In recognizing static hand gestures, the image of the hand is preferably localized from the rest of the image to permit identification and classification. The edges of the image are preferably found with a Sobel operator. A box which tightly encloses the hand is also located to assist in the identification.

Dynamic (circular and skew) gestures are preferably treated as one-dimensional oscillatory motions. Recognition of higher-dimensional motions is achieved by independently recognizing multiple, simultaneously created one-dimensional motions. A circle, for example, is created by combining repeating motions in two dimensions that have the same magnitude and frequency of oscillation, but wherein the individual motions ninety degrees out of phase. A diagonal line is another example. Distinct circular gestures are defined in terms of their frequency rate; that is, slow, medium, and fast.

Additional dynamic gestures are derived by varying phase relationships. During the analysis of a particular gesture, the x and y minimum and maximum image plane positions are computed. Z position is computed if the system is set up for three dimensions. If the x and y motions are out of phase, as in a circle, then when x or y is minimum or maximum, the velocity along the other is large. The direction (clockwiseness in two dimensions) of the motion is determined by looking at the sign of this velocity component. Similarly, if the x and y motion are in phase, then at these extremum points both velocities are small. Using clockwise and counter-clockwise circles, diagonal lines, one-dimensional lines, and small and large circles and lines, a large gesture lexicon library is developed. A similar method is used when the gesture is performed in three dimensions.

An important aspect of the technique is the use of parameterization and predictor bins to determine a gesture's future position and velocity based upon its current state. The bin predictions are compared to the next position and velocity of each gesture, and the difference between the bin's prediction and the next gesture state is defined as the residual error. A bin predicting the future state of a gesture it represents will exhibit a smaller residual error than a bin predicting the future state of a gesture that it does not represent. For simple dynamic gestures applications, a linear-with-offset-component model is preferably used to discriminate between gestures. For more complex gestures, a variation of a velocity damping model is used.

In commonly assigned U.S. patent application Ser. No. 09/798,594, we describe a real-time object tracking system (ROTS) capable of tracking moving objects in a scene. Unlike current search-and-locate algorithms, the subject algorithm uses a target location technique which does not involve search. The system, which is also applicable to the vehicular applications according to the present invention, tracks objects based on the color, motion and shape of the object in the image. The tracking algorithm uses a unique color matching technique which uses minimal computation. This color matching function is used to compute three measures of the target's probable location based on the target color, shape and motion. It then computes the most probable location of the target using a weighting technique. These techniques make the invention very computationally efficient also makes it robust to noise, occlusion and rapid motion of the target.

The imaging hardware includes a color camera, a frame grabber, and a computer for processing. The software includes low-level image grabbing software and the tracking algorithm. Once the application is running, a graphical user interface displays the live image from the color camera on the computer screen. The operator can then use the mouse to click on the hand in the image to select a target for tracking. The system will then keep track of the moving target in the scene in real-time.

A schematic of the system is shown in FIG. 1. The imaging hardware includes a color camera 102 and a digitizer. The sequence of images of the scene is then fed to a computer 104 which runs tracking software according to the invention. The tracking algorithm is independent of the imaging system hardware. The tracking system has a graphical user interface (GUI) to initialize the target and show the tracking result on the screen 106.

The GUI for the ROTS displays a live color image from the camera on the computer screen. The user can initialize the target manually or automatically. Once initialized, the ROTS will then track the target in real-time.

Figure 2:
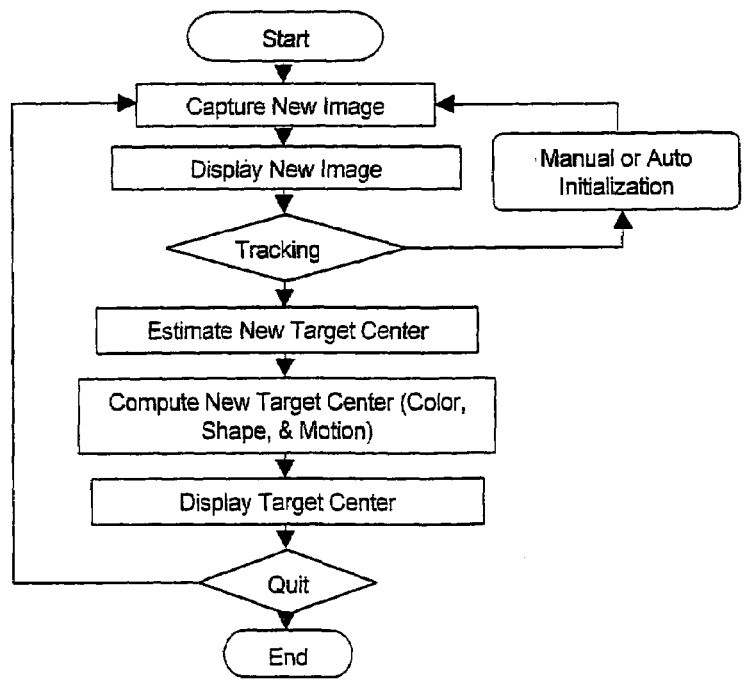
FIG. 2 is a flow chart illustrating important steps of the tracking algorithm.

The flow chart of the tracking algorithm is shown in FIG. 2. The program captures live images from the camera and displays them on the screen. It then allows the user to select the target manually using the mouse or automatically by moving the target to a predetermined position in the scene. At the point of initialization, the color, the shape and location of the target are computed and stored. Once the target is initialized, we compute an estimate of the target location using target dynamics. We then compute the actual location using the color, shape and motion information with respect to a region centered at the estimated location.

Figure 3:
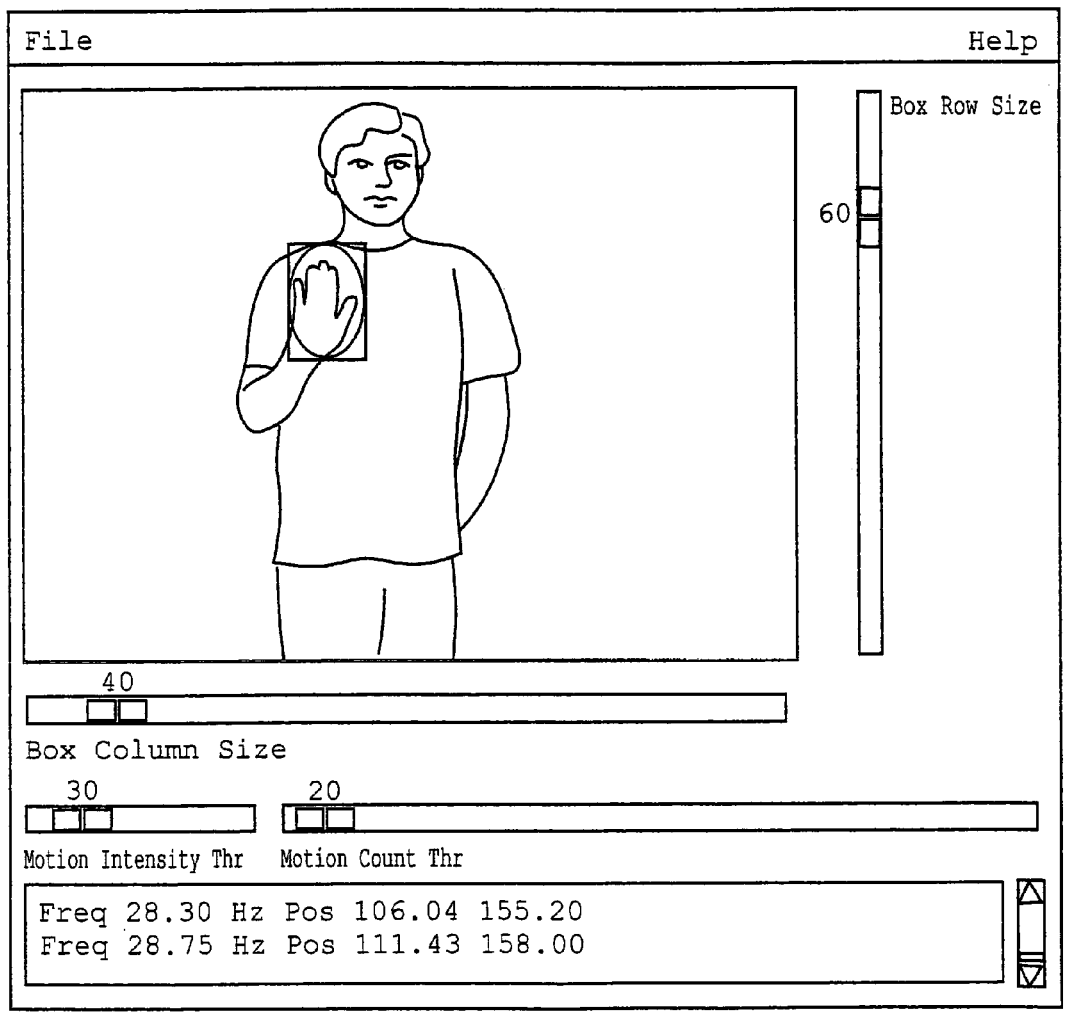
FIG. 3 is a drawing of a preferred graphical user interface for use with the system of the invention.
Figure 4:
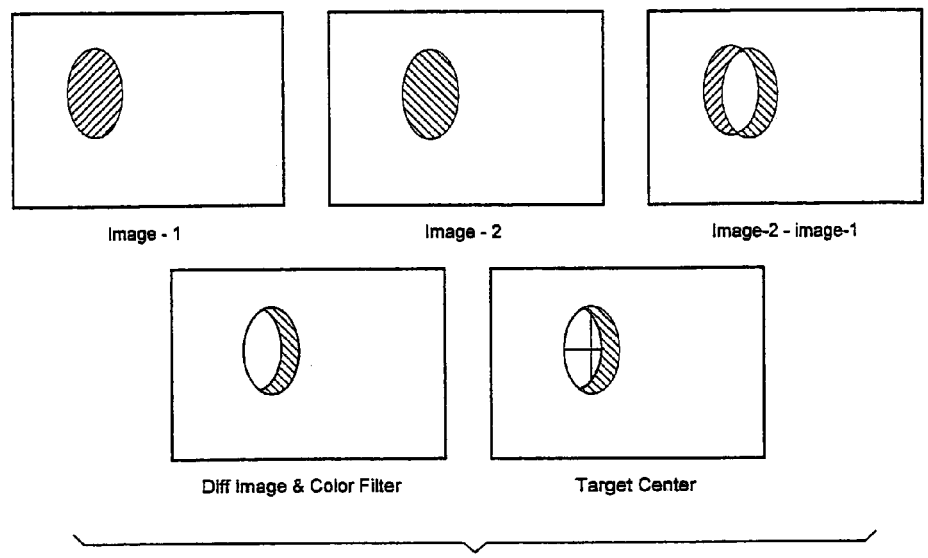
FIG. 4 is a series of drawings which show the use of color to track a target or feature.

The input to the ROTS is a sequence of color images, preferably in the standard RGB24 format. Hence, the hardware can be a camera with a image grabbing board or a USB camera connected to the USB port of the computer. A preferred GUI is shown in FIG. 3.

Tracking using Color, Shape and Motion

Once the user clicks on the target in the image, we compute the median color of a small region around this point in the image. This will be the color of the target region being tracked in the scene until it is reinitialized. We also store the shape of the target by segmenting the object using its color. Once tracking begins, we compute the center of the target region in the image using a combination of three aspects of the target. The three aspects are the color, the shape and the motion. This results in a very robust tracking system which can withstand a variety of noise, occlusion and rapid motion.

Color Matching

The color of a pixel in a color image is determined by the values of the Red, Green and Blue bytes corresponding to the pixel in the image buffer. This color value will form a point in the three-dimensional RGB color space. When we compute the color of the target, we assume that the target is fairly evenly colored and the illumination stays relatively the same. The color of the target is then the median RGB value of a sample set of pixels constituting the target. When the target moves and the illumination changes the color of the target is likely to change. We use a computationally efficient color matching function which allows us to compute whether a pixel color matches the target color within limits.

Figure 5:
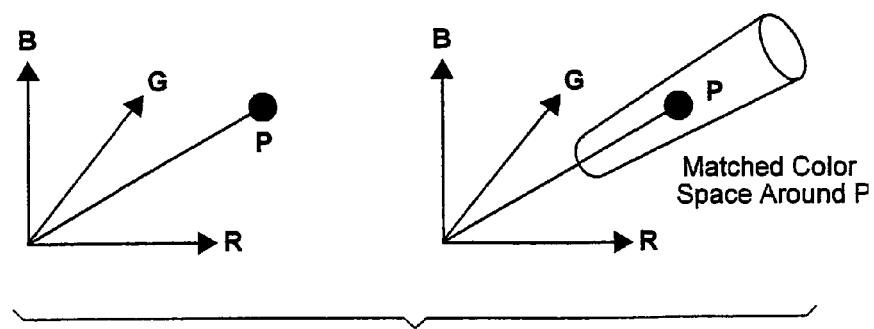
FIG. 5 illustrates the use a truncated cone to account for slight variations in color.

When the illumination on the target changes, the intensity of the color will change. This will appear as a movement along the RGB color vector as shown in FIG. 5. In order to account for slight variations in the color, we further allow the point in color space to lie within a small-truncated cone as shown in FIG. 5. The two thresholds will decide the shape of the matching color cone. A threshold on the angle of the color cone and another threshold on the minimum length of the color vector decides the matching color space. Thus, any pixel whose color lies within the truncated cone in color space will be considered as having the same color as the target.

Given a colored pixel, we quantitatively define the match between it and a reference color pixel as follows. Let (R, G, B) be the values of the RGB vector of the first pixel. Let ($R_r$, $G_r$, $B_r$) be the RGB vector for the reference color.

$$d = RR_r + GG_r + BB_r$$

$$m_r = R_r^2 + G_r^2 + B_r^2$$

$$m = R^2 + G^2 + B^2$$

$$d_m = \frac{d}{m_r}$$

$$d_a = \frac{d}{\sqrt{m_r m}}$$

$$ColorMatch(R, G, B) = \begin{cases} d_m d_a & \text{if } ((d_m^l < d_m < d_m^h) \ \& \ (d_a^l < d_a < d_a^h)) \\ 0 & \text{otherwise} \end{cases}$$

The value of $d_m$ is related to the length of the projection of the given color vector onto the reference vector. The value of $d_a$ is related to the angle between the two vectors. If we set two threshold bands for $d_m$ and $d_a$, we can filter out those pixels which lie within the truncated cone around the reference vector. Their product will indicate the goodness of the match. The parameters $d_m$ and $d_a$ are chosen to be computationally simple to implement which becomes important when all the pixels in a region have to be compared to the reference color in each new image.

Position Using Color

Once we have the target color and a color matching algorithm, we can find all the pixels in any given region of the image which match the target color. We use the quantitative measure of the match to find a weighted average of these pixel positions. This gives us the most likely center of the target based on color alone. If (i, j) are the row and column coordinates of the pixel $P_c(i,j)$, then for a given rectangular region the most likely target center based on color alone will be given as follows.

$$P_c(i, j, t) = ColorMatch\ (R(i, j, t), G(i, j, t), B(i, j, t))$$

$$Center_{color} = \begin{bmatrix} r_c \\ c_c \end{bmatrix} = \begin{bmatrix} \frac{\sum_{1}^{I*J} P_c(i, j, t) * i}{\sum_{1}^{I*J} P_c(i, j, t)} \\ \frac{\sum_{1}^{I*J} P_c(i, j, t) * j}{\sum_{1}^{I*J} P_c(i, j, t)} \end{bmatrix}$$

Note that the centroid of the target is computed as a weighted sum. The weights are the color matching measure of the pixel. This weighting of the pixel contrasts with the usual practice of weighting all matching pixels the same makes our algorithm less prone to creep. We also keep track of the sum of the matched pixel weights. If this sum is less than a threshold we assume that the target is not in the region.

Shape Matching

Once the target is initialized, we compute a two-dimensional template of the target. We use this dynamic template which is updated every frame to measure the closeness of pixels at the estimated location to the target shape. Given the color of the object being tracked and the color matching function we segment all the pixels in a region around the estimated location. The resulting segmented image is the shape of the object and forms the template. With each new image of the scene, the template of the target in the previous frame is used to compute the new center of the target in the new image. The advantage of using templates instead of any assumed shape such as an ellipse is that the tracking and localization of the target is much more robust to shape change and hence more accurate.

$$P(i, j, t) = ColorMatch(R(i, j, t), G(i, j, t), B(i, j, t)) \text{ for time} = t$$

$$M(i, j, t-1) = \begin{cases} 1 & \text{if } (P(i, j, t-1) > 0) \\ 0 & \text{otherwise} \end{cases}$$

$$S(i, j, t) = P(i, j, t)M(i, j, t-1)$$

$$Center_{shape} = \begin{bmatrix} r_s \\ c_s \end{bmatrix} = \begin{bmatrix} \frac{\sum_1^{I*J} S(i, j, t) * i}{\sum_1^{I*J} S(i, j, t)} \\ \frac{\sum_1^{I*J} S(i, j, t) * j}{\sum_1^{I*J} S(i, j, t)} \end{bmatrix}$$

The closeness of the shape is a summation of the product of the pixel color match P(i, j) with the target template M(i, j). Note again that the color matching measure is used to weight the shape measure. This makes our algorithm robust to creep. Once the region S is obtained, we can compute the centroid of S. This is the probable location of the target based solely on the shape of the target.

Motion Detection

The algorithm checks for motion in a region near the estimated target position using a motion detecting function. This function computes the difference between the current image and the previous image, which is stored in memory. If motion has occurred, there will be sufficient change in the intensities in the region. The motion detection function will trigger if a sufficient number of pixels change intensity by a certain threshold value. This detection phase eliminates unnecessary computation when the object is stationary.

Position Using Motion

If the motion detection function detects motion, the next step is to locate the target. This is done using the difference image and the target color. When an object moves between frames in a relatively stationary background, the color of the pixels changes between frames near the target (unless the target and the background are of the same color). We compute the color change between frames for pixels near the target location. The pixels whose color changes beyond a threshold make up the difference image. Note that the difference image will have areas, which are complementary. The pixels where the object used to be will complement those pixels where the object is at now. If we separate these pixels using the color of the target, we can compute the new location of the target. The set of pixels in the difference image, which has the color of the target in the new image, will correspond to the leading edge of the target in the new image. If we assume that the shape of the target changes negligibly between frames, we can use the shape of the target from the previous image to compute the position of the center of the target from this difference image.

Let D be the difference sub-image between the previous target and the estimated target location in the new image. If we threshold the difference image, we end up with a binary image. If we intersect this binary image D with the shape of the target in the new image M we get the moving edge of the target as the region V. We then weight this region by the color matching measure P.

$$D(i, j, t) = \begin{cases} 1 & \text{if } |P(i, j, t) - (P(i, j, t-1)| > \tau_m \\ 0 & \text{otherwise} \end{cases}$$

$$M(i, j, t) = \begin{cases} 1 & \text{if } (P(i, j, t) > \tau_c) \\ 0 & \text{otherwise} \end{cases}$$

$$V(i, j, t) = (D(i, j, t) \cap M(i, j, t)) * P(i, j, t)$$

$$Center_{motion} = \begin{bmatrix} r_m \\ c_m \end{bmatrix} = \begin{bmatrix} \frac{\sum_1^{I*J} V(i, j, t) * i}{\sum_1^{I*J} V(i, j, t)} \\ \frac{\sum_1^{I*J} V(i, j, t) * i}{\sum_1^{I*J} V(i, j, t)} \end{bmatrix}$$

The centroid of the region V is then computed as the probable location of the target based on motion alone. This weighting of the intersection region by the color matching measure makes our tracking less prone to jitter.

In a physically implemented system, processing a large image may slow down the program. Fortunately, the nature of the tracking task is such that, only a fraction of the image is of interest. This region called the window of interest lies around the estimated position of the target in the new image. We can compute the location of the target in the new image from the location of the target in the previous image and its dynamics. We have used prediction based on velocity computation between frames. This technique is able to keep track of the target even when the target moves rapidly. We have found that the window of interest is typically one one-hundredth the area of the original image. This speeds up the computation of the new target location considerably.

Tracking Algorithm

If we are given an estimated target location as (rc, cc) in the new image and the size of the area to be searched is given by (rs, cs), then the algorithm can be written in pseudo code as shown in FIG. 6.

Note that the color matching weight c is being used to weight all the three centers. This weighting makes this algorithm smoother and more robust. The velocity computed at the end of the tracking algorithm is used to compute the estimated position of the target in the next frame.

Extensions of the system are possible in accordance with the described algorithm herein. One is a tracking system which can track multiple targets in the same image. Another uses the tracking in two stereo images to track the target in 3D.

Vehicular Applications

Figure 7:
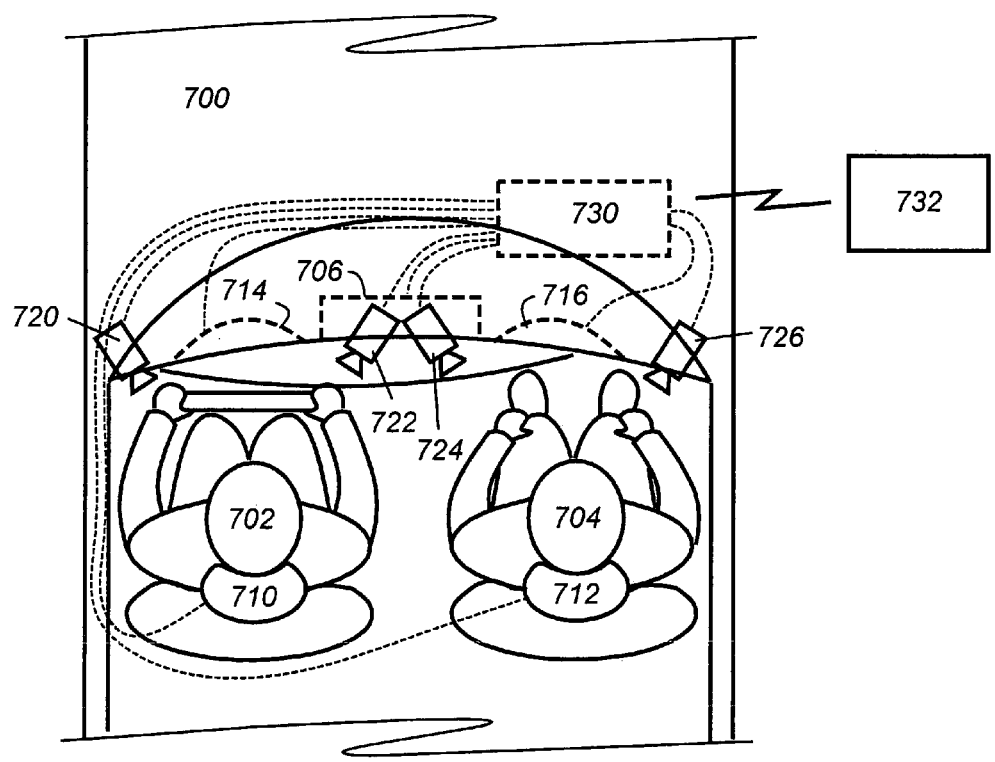
FIG. 7 is a simplified diagram illustrating the applicability of gesture control to vehicular applications.

Using the technology described above, various implementations are applicable to the vehicular environment, as depicted in FIG. 7. One embodiment, for example, allows an operator or passenger to control comfort or entertainment features such the heater, air conditioner, lights, mirror positions or the radio/CD player using hand gestures. An alternative would allow for the automatic adjustment of car seating restraints based on head position. Yet another embodiment would be used to determine when to fire an airbag (and at what velocity or orientation) based on the position of a person in a vehicle seat.

As discussed above, a generic interactive system of this type would include the following components (described in detail above):

1. One or more cameras (or other sensing system) to view the driver or passenger;
2. A tracking system for tracking the position, velocity or acceleration of person's head, body, or other body parts;
3. A gesture/behavior recognition system for recognizing and identifying the person's motions; and
4. Algorithms for controlling devices in the vehicle, whether under active or passive control by the vehicle occupant.

In terms of the sensing system cameras could be mounted anywhere within the vehicle having a suitable view of the person. Other types of sensing systems could alternatively be used. Tracking may be carried out from one or multiple systems, and would preferably return a position in two or three-dimensional space. The gesture/behavior recognition system described above and in the referenced applications would preferably be used to convert the tracked motions into gestures and behaviors. These behaviors would be identified as controls for active or passive systems located in the vehicle. The system would then use the position and gesture information to control various vehicle features, such as the radio, seat position, air-bag deployment, on-board map systems, etc.

ADDITIONAL EMBODIMENTS

The invention may also be used to control systems outside of the vehicle. The on-board sensor system would be used to track the driver or passenger, but when the algorithms produce a command for a desired response, that response (or just position and gesture information) could be transmitted via various methods (wireless, light, whatever) to other systems outside the vehicle to control devices located outside the vehicle. For example, this would allow a person to use gestures inside the car to interact with a kiosk located outside of the car.

The invention claimed is:

1. A method of controlling one or more vehicular-related devices, comprising the steps of:
   tracking the position, velocity or acceleration of the head, body or other body parts of a vehicle driver or passenger;
   determining the position or motion of the driver or passenger using gesture or behavior recognition; and
   controlling a device associated with the operation, safety or comfort of the vehicle in accordance with the recognized position or motion.

2. The method of claim 1, wherein the recognized motion includes a hand or body gesture.

3. The method of claim 1, wherein the device is associated with entertainment.

4. The method of claim 1, wherein the device is seat restraints based on head position.

5. The method of claim 1, the device is an airbag.

6. The method of claim 5, further including the control of the velocity or orientation of the airbag based upon body position, velocity or acceleration.

7. The method of claim 1, further including the control of a device external to the vehicle.

8. A system for controlling one or more vehicular-related devices, comprising:
   a device for sensing the position or motion of the head, body, or other body parts of a driver or passenger of a vehicle;
   a tracking system for tracking the head, body, or other body parts;
   a gesture/behavior recognition system for recognizing and identifying the person's motions; and
   a controller for controlling devices associated with the vehicle, whether under active or passive control by the vehicle occupant.

9. The system of claim 8, wherein the device for sensing is a video camera.

10. The system of claim 8, wherein the device is associated with entertainment.

11. The system of claim 8, including the adjustment of car seating restraints based on head position.

12. The system of claim 8, including the deployment of an airbag based on the position, velocity or acceleration of a person in a vehicle seat.

13. The system of claim 12, further including the control of the velocity or orientation of the airbag based upon body position, velocity or acceleration.

14. The system of claim 8, further including the control of a device external to the vehicle.

* * * * *